(12) United States Patent
Schneider et al.

(10) Patent No.: US 9,617,428 B2
(45) Date of Patent: Apr. 11, 2017

(54) MODIFYING THE SURFACES OF METAL OXIDES BY MEANS OF CHAIN-LIKE STRUCTURES

(71) Applicant: Wacker Chemie AG, Munich (DE)

(72) Inventors: Achim Schneider, Burghausen (DE); Torsten Gottschalk-Gaudig, Mehring (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/105,965

(22) PCT Filed: Dec. 10, 2014

(86) PCT No.: PCT/EP2014/077208
§ 371 (c)(1),
(2) Date: Jun. 17, 2016

(87) PCT Pub. No.: WO2015/091153
PCT Pub. Date: Jun. 25, 2015

(65) Prior Publication Data
US 2016/0312034 A1   Oct. 27, 2016

(30) Foreign Application Priority Data
Dec. 18, 2013 (DE) .................. 10 2013 226 494

(51) Int. Cl.
| | | |
|---|---|---|
| C09C 3/12 | (2006.01) | |
| C09C 1/30 | (2006.01) | |
| C08K 9/06 | (2006.01) | |
| C09D 5/03 | (2006.01) | |
| C09D 7/12 | (2006.01) | |
| C09J 11/04 | (2006.01) | |
| G03G 9/097 | (2006.01) | |

(52) U.S. Cl.
CPC .............. *C09C 1/3081* (2013.01); *C08K 9/06* (2013.01); *C09C 3/12* (2013.01); *C09D 5/037* (2013.01); *C09D 7/1225* (2013.01); *C09J 11/04* (2013.01); *G03G 9/09716* (2013.01); *C01P 2006/12* (2013.01); *C09C 1/30* (2013.01)

(58) Field of Classification Search
CPC ........... C09C 1/3081; C09C 3/12; C09C 1/30; C08K 9/06; C01P 2006/12; C09D 5/037; C09D 7/1225; C09J 11/04; G03G 9/09716; Y10T 428/2982
USPC ........................................................ 428/403
See application file for complete search history.

(56) References Cited

U.S. PATENT DOCUMENTS

| | | | |
|---|---|---|---|
| 3,920,865 A | 11/1975 | Lauefer et al. | |
| 3,924,029 A | 12/1975 | Schutte et al. | |
| 5,013,585 A * | 5/1991 | Shimizu ................ | B82Y 30/00 427/215 |
| 5,686,054 A | 11/1997 | Barthel et al. | |
| 6,887,518 B2 | 5/2005 | Barthel et al. | |
| 8,071,215 B2 | 12/2011 | Meyer et al. | |
| 9,127,026 B2 | 9/2015 | Mariot et al. | |

FOREIGN PATENT DOCUMENTS

| | | |
|---|---|---|
| DE | 1163784 B | 2/1964 |
| DE | 1916360 A1 | 10/1970 |
| DE | 102004055585 * | 5/2006 |
| DE | 102004055585 A1 | 5/2006 |
| EP | 0686676 A1 | 12/1995 |
| EP | 1304361 * | 4/2003 |
| EP | 1304361 A1 | 4/2003 |
| WO | WO2013/024137 * | 5/1991 |
| WO | 2013024137 A1 | 2/2013 |

OTHER PUBLICATIONS

Engelhardt, G. et al., "Structure Investigation of Organosilicon Polymers by Silicon-29 NMR", Polymer Bulletin 1981, 5, 577-584, 8 pgs.

Sears, G. W. et al., "Determination of Specific Surface Area of Colloidal Silica by Titration with Sodium Hydroxide", Analytical Chemistry 1956, 28, 1981ff, 3 pgs.

* cited by examiner

Primary Examiner — Leszek Kiliman
(74) Attorney, Agent, or Firm — Brooks Kushman P.C.

(57) ABSTRACT

Metal oxides surface modified with M and D groups where the D groups are in excess relative to the M groups exhibit high rheology properties in liquid compositions and provide products with elevated mechanical properties. The modified metal oxides contain a significant quantity of unreacted silanol groups, and can be more easily incorporated into polar organic substances, and also increase physical properties of cured polymers containing the modified metal oxides.

16 Claims, No Drawings

MODIFYING THE SURFACES OF METAL OXIDES BY MEANS OF CHAIN-LIKE STRUCTURES

CROSS REFERENCE TO RELATED APPLICATIONS

This application is the U.S. National Phase of PCT Appln. No. PCT/EP2014/077208 filed Dec. 10, 2014, which claims priority to German Application No. 10 2013 226 494.1 filed Dec. 18, 2013, the disclosures of which are incorporated in their entirety by reference herein.

BACKGROUND OF THE INVENTION

1. Field of the Invention

The invention relates to surface-modified nanostructured metal oxides which can be used in use as reinforcing fillers or as rheological additives for adjusting viscosity, yield point, shear-thinning, and also thixotropic properties in coating materials such as paints and varnishes, but also adhesives, sealants and plastics.

2. Description of the Related Art

Organofunctional particulate metal oxides are often used as active fillers for improving the mechanical properties of materials which have diverse uses. It is possible by this means, for example, to improve the scratch resistance of coatings such as paints and varnishes, or to vary the mechanical properties of adhesives and sealants or plastics, for example, silicone elastomers, in a targeted manner.

Moreover, even in the uncrosslinked state of the matrix systems, the nanostructured fillers perform an extremely important function. For example, the dispersions generally have relatively high viscosities and in many cases even viscoelastic properties. This pseudoplastic behaviour plays a decisive role in particular for the processing properties of the corresponding material. Through modification of the surface of the particulate fillers, it is possible to control the interactions with the matrix surrounding them and thus the viscoelastic behavior of the dispersion.

For the surface modification, compounds are often used which form chemically bonded, oligomeric dimethylsiloxane units under suitable process conditions. As described in the patent specification DE 1 163 784, these units can be built up from dimethylsiloxy units capable of condensation.

However, oligo- or polydimethylsiloxanes that are cyclic (DE 1 916 360) or linear (EP 0 686 676) are also used for the hydrophobicization. In the production processes applied therein, a process step is usually included in which drastic temperatures significantly higher than 250° C. prevail. In this way, it is possible to achieve a comparatively uniform modification of the surface. However, it is also generally known that polydimethylsiloxanes enter into depolymerization reactions under these temperatures, for which reason the resulting products are characterized by comparatively short dimethylsiloxane chains.

Last but not least, as high as possible a thickening effect of the metal oxide is generally desired for reasons of cost efficiency in the event of use as a rheological additive. When used in polar organic systems such as e.g. in epoxide or unsaturated polyester resins, the thickening effect of the resulting products largely correlates with the degree of coating. Thus, for example, the specifications DE 1 916 360 and EP 0 686 676 point to the importance of the high degree of hydrophobicization and thus low residual content of silanol groups on the oxide surface. However, the increasing incompatibility of the metal oxide with the polar target matrix mostly also leads to significantly increased incorporation times and/or poorer dispersion of the filler in the matrix.

Moreover, the surface modification of all of the dimethylsiloxy-functional metal oxides described in the aforementioned specifications are not sufficiently stable under alkaline conditions. Laboratory experiments relating to storage stability of dispersions of the metal oxides in amine-group-rich matrices mostly reveal a significant change in the pseudoplastic behavior over several hours or days.

Thus, the dimethylsiloxane-modified silicas available hitherto, for example when used as a thickener of a typical amine curing agent of a two-component epoxy adhesive, reveal no significant technical advantage compared to a nonmodified, hydrophilic silica. Thus, for example, the viscosity and thickening effect of HDK® H18 (surface-modified silica) is slightly higher compared to HDK® N20 (unmodified silica), but this has not led to a more widespread application of HDK® H18 since the costs of this silica are significantly higher.

If the currently available dimethylsiloxane-modified silicas are used in a typical STPE sealant formulations, then the compositions exhibit an increase in viscosity and a particularly greatly pronounced increase in shear stress. The latter has proven to be extremely disadvantageous during the application of the compositions since considerably greater forces are required in order to overcome the yield point.

SUMMARY OF THE INVENTION

The object of the present invention is therefore to overcome the deficiencies of the current prior art and to provide surface-modified metal oxides which are characterized by a high thickening effect in polar organic systems, but which nevertheless can be readily dispersed in these systems, and with which it is also possible to produce storage-stable dispersions in media which have groups with a basic character. These and other objects are achieved by providing particulate nanostructured metal oxides which have groups of the general formulae $R^1R^2R^3SiO_{1/2}$ (M) and $R^4R^5Si(O_{1/2})_2$ (D), where $R^1$, $H^2$, $R^3$, $R^4$ and $R^5$ is in each case a monovalent hydrocarbon radical having 1 to 24 carbon atoms, and $R^1$, $R^2$, $R^3$, $R^4$ and $R^5$ can be identical or different.

DETAILED DESCRIPTION OF THE PREFERRED EMBODIMENTS

Surprisingly, the metal oxides according to the invention are characterized, even in the case of comparatively high residual silanol contents, by a high thickening effect and a pronounced rheological profile in polar organic resins and can nevertheless unexpectedly be incorporated into these resins easily. In contrast to the prior art, it is possible, e.g. using the metal oxides according to the invention in an epoxy resin component, to obtain exceptional results which are evident from a high viscosity coupled with considerably lower incorporation time. The use of the metal oxides according to the invention, moreover, has the advantage that the storage stability is significantly increased, where, compared to the prior art, in particular a considerably lower shear stress is achieved after a storage time of approx. one month.

The metal oxides according to the invention have groups of the general formulae $R^1R^2R^3SiO_{1/2}$ and $R^4R^5Si(O_{1/2})_2$, i.e. they are modified with groups of the general formulae $R^1R^2R^3SiO_{1/2}$ and $R^4R^5Si(O_{1/2})_2$.

The particulate metal oxides according to the invention are characterized by chain-like siloxane structures which have an as homogeneous as possible distribution of chain lengths. Preferably, the siloxane chains are, as completely as possible, permanently fixed to the surface of the metal oxide. Furthermore, the chemical bonding of the siloxane chain preferably takes place via an individual binding site to the surface of the metal oxide.

The metal oxides according to the invention can be selected, for example, from groups 1 to 5 and 13 to 15 of the Periodic Table of the Elements, in which connection it is noted that the expression "metal oxide" used for reasons of simplicity here expressly also includes the oxides of the semimetals of group 14. Preference is given to using the tri- and tetravalent oxides of groups 4, 13 and 14. Particular preference is given to using silica. In the context of the invention, silica means oxygen acids of silicon and includes precipitated silica and pyrogenic silica. The silica is most preferably silica produced pyrogenically.

The radical R, which includes the radicals $R^1$ to $R^{11}$, is selected from the group of saturated, mono- or polyunsaturated, unbranched or branched hydrocarbon radicals which optionally further contain heteroatoms and/or functional groups.

Preferably, the radicals R are alkyl, alkenyl and/or aryl radicals such as methyl, ethyl, propyl such as n-propyl or i-propyl, butyl such as n-butyl, isobutyl or t-butyl, hexyl such as n-hexyl or isohexyl, octyl such as n-octyl or isooctyl, dodecyl, tetradecyl, hexadecyl, octadecyl, vinyl, allyl, phenyl, o-tolyl, m-tolyl, p-tolyl, xylyl, mesityl or naphthyl radicals.

The alkyl or aryl radicals can moreover also further contain heteroatoms or functional groups. Preference is given here to monovalent organic groups of the general formula $R=(CH_2)_n Y$ where n=1 to 24 and Y=vinyl, acrylate, methacrylate, glycidoxy, —SH, —OH, primary amine radicals (—$NH_2$), secondary amine radicals (—NHR) such as the N-monomethyl, N-monoethyl, N-monopropyl, N-monobutyl, N-cyclohexyl or anilino radicals, tertiary amine radicals, (—$NR_2$) such as the N,N-dimethyl, N,N-diethyl, N,N-dipropyl, N,N-dibutyl, N,N-methylethyl, N,N-methylpropyl, N,N-ethylpropyl, N,N-methylphenyl, morpholino, pyrrolyl, indolyl, pyrazolyl, imidazolyl or piperidyl radicals, quaternary amine radicals such as the N,N,N-trimethylammonium, N,N,N-triethylammonium or N,N,N-tripropylammonium radicals, phosphonato, —$P(O)(OR^6)_2$ ($R^6$ selected from methyl, ethyl or phenyl groups), isocyanato and protected isocyanato groups (—N(H)C(O) G, where the protective group G is cleaved off during thermal stress as H-G, where H-G=methyl 2-hydroxybenzoate, 2-hydroxypyridine, 1-hydroxylmethyl-1,2,4-triazole, N,N-diethylhydroxylamine, 2-butanone oxime, dimethyl malonate, ethyl acetoacetate, diisopropylamine, benzyl-tert-butylamine, tert-butylmethylamine, tert-butylisopropylamine, 2-isopropylimidazole, 3,5-di-methylpyrazole or ε-caprolactam) or dihydro-3-yl-2,5-furandione.

The surface of the metal oxide can be modified with a variety of the aforementioned groups. The surface of the metal oxide is preferably modified exclusively with one type of the aforementioned groups R.

Moreover, further organosilicon groups of the general formula $R^{11}Si(O_{1/2})_3$ can also be present, where the substituent $R^{11}$ is selected from the hydrocarbon radicals specified above for R.

The metal oxides according to the invention have specific surface areas of from 1 to 600 $m^2/g$, preferably 40 to 400 $m^2/g$ and most preferably 150 to 270 $m^2/g$ (determined by the BET method in accordance with DIN 66131 and 66132).

The bulk densities of the metal oxides according to the invention (determined in accordance with DIN EN ISO 787-11) are in the range from 10 to 200 g/l, preferably 20 to 100 g/l, and most preferably 20 to 60 g/l.

The degree of modification can be analyzed by determining the residual silanol content. The metal oxides according to the invention are preferably characterized in that they have a residual silanol content in the range from 30 to 90%, more preferably from 45 to 85% and most preferably from 55 to 75%.

The carbon content (% C, in weight percent) of the silicas according to the invention conforms to the equation % C≥A+B·% SiOH, where preferably A=9 and B=−0.15 and the values % C, A and % SiOH are given in percent. In a particularly preferred embodiment, A=10 and B=−0.125. Most preferably, A=10 and B=−0.1.

Preferably, the metal oxides according to the invention are characterized in that they have a residual silanol content in the range from 30 to 90%, more preferably from 45 to 85% and most preferably from 55 to 75%, and the following is applicable for the carbon content: % C≥A+B % SiOH, where A=9 and B=−0.15, and the values % C, A and % SiOH are given in percent. Consequently, it has surprisingly discovered that a relatively high carbon content can be achieved with a relatively high residual silanol content.

In a further preferred embodiment, the residual silanol content is in the range from 10 to 40% and more preferably from 20 to 35%, with the following again being applicable for the carbon content: % C≥A+B·% SiOH, where A=9 and B=−0.15, and the values % C, A and % SiOH are given in percent.

If the specified metal oxide is pyrogenic silica, a suitable method for determining the residual silanol content (% SiOH, given in percent) following modification by acid-based titration is e.g. described in G. W. Sears et al., *Analytical Chemistry* 1956, 28, 1981ff.

The metal oxides according to the invention are characterized in that the groups introduced by the modification are bonded firmly to the surface of the metal oxide. A firm bond represents good chemical bonding and is quantified in accordance with the invention through the fraction of modified metal oxide that can be extracted with solvents, which is preferably at most 10% by weight. More preferably, the extractable fraction is at most 6% by weight, in particular at most 4% by weight and especially at most 2% by weight. A suitable method for evaluating the bonding strength of a modification is the quantitative determination of extractable silane, i.e. of silane not bonded chemically to the surface of the metal oxide.

A solvent is a substance which is able to dissolve or dilute gases, liquids or solids without resulting in any chemical reactions between dissolved substance and dissolving substance. The solvent used for investigating the metal oxides according to the invention, tetrahydrofuran, also does not break any of the chemical bonds between the modifying agents and the surface of the metal oxide. The constituents extractable with this solvent are therefore joined to the metal oxide merely by means of weaker interactions such as, for example, Van-der-Waals forces.

A low measurement value for the extractable fraction points to a better chemical, i.e. firmer, bonding of the modifying agent to the surface of the metal oxide.

Methanolic/aqueous dispersions of the metal oxides according to the invention preferably have pH values in the range from 4 to 10.5. In a particularly preferred embodiment, these are in the range from 4 to 7 and most preferably in the range from 4.5 to 5.5. In a further preferred embodiment, the pH values are preferably in the range from 9-11 and more preferably from 9.5-10.5.

Solid-state nuclear magnetic resonance spectroscopy ($^{29}$Si-SP/MAS-NMR) can be used to demonstrate signals for the $R^1R^2R^3SiO_{1/2}$ (M) and the $R^4R^5Si(O_{1/2})_2$ (D) groups for the metal oxides according to the invention. The relative intensities of these signals (determined by integration of the signals) are preferably in the range D/M=1 to 50, more preferably in the range from 3 to 30 and most preferably from 10 to 20. In a specific embodiment, the spectra of the products according to the invention exhibit a relative D/M ratio of 14 to 15, which means that the number of D groups which can be detected with the described method for the metal oxide is 14 to 15 times higher than that of the M groups.

$^{29}$Si-SP/MAS-NMR spectroscopy is a quantitative method, i.e. the relative intensity of the detected signals reflects the numerical ratio of the corresponding groups actually present. Accordingly, the intensity of the signals detected by the much more frequently used double resonance experiment $^{29}$Si-CP/MAS-NMR is greatly dependent on the mobility of the chemical groups. In general, the point may be made that groups with increasing mobility (e.g. at the end of a relatively long chain) bring about lower signal intensities under identical measuring conditions.

The spectra obtained in the $^{29}$Si-CP/MAS-NMR for the metal oxides according to the invention preferably have a relative D/M ratio of >3, more preferably >10, and most preferably of >100. This means that the number of M groups detectable with the described method for the metal oxide is preferably very low. It is especially preferred that with the $^{29}$Si-CP/MAS-NMR for the metal oxide, no signal can be detected for M groups which stands out from the background noise caused by virtue of the method. This means that the M end groups are preferably present at the end of D chains that are as long as possible.

A further subject of the present invention relates to a method of surface modifying metal oxides, characterized in that the metal oxides are treated with monofunctional siloxanes of the general formula $R^1R^2R^3Si(OSiR^4R^5)_mX$, where X is a reactive group; $R^1$, $R^2$, $R^3$, $R^4$ and $R^5$ is in each case a monovalent hydrocarbon radical having 1 to 24 carbon atoms and m=0 to 50, and $R^1$, $R^2$, $R^3$, $R^4$ and $R^5$ can be identical or different.

The value for in is between 0 and 50. Preferably, the value for m is in the range from 5 to 40. On account of technical advantages, m is most preferably in the range from 10 to 20.

Substituent X is a reactive group such as, for example, hydroxy, halogen, amine radicals, $OR^8$, $OC(O)R^9$, $O(CH_2)_i$ OH, or $O(CH_2)_iOR^{10}$, where the following is applicable: i=0 to being essentially unlimited, preferably i=1 to being essentially unlimited, more preferably i=1 to 10 and most preferably i=2. The radicals $R^1$ to $R^5$ are as defined above, for the radicals $R^8$-$R^{10}$ the definition described at the start for R is applicable.

The modifying agents used are monofunctional siloxanes of the general formula $R^1R^2R^3Si(OSiR^4R^5)_mX$, where these can be used alone or in any desired mixtures. Preference is given to using two different siloxanes in the modification reaction, most preferably only one siloxane.

Preferably, the siloxanes used are oligodimethylsiloxanes, i.e. the radicals $R^4$ and $R^5$ are methyl groups (Me). Most preferably, the radicals $R^2$ and $R^3$ are also methyl groups. In a specific embodiment of the invention, siloxanes of the general formula $Me_3Si(OSiMe_2)_kOH$ are used, as described for example in EP 1 883 666, where k has the meaning given above for i.

The siloxanes can be used in any desired amounts. Preferably, the amount used is 5 to 50% by weight and more preferably 20 to 40% by weight, based on the unmodified metal oxide. In a specific embodiment of the invention, particular preference is given to using 15 to 25% by weight of the monofunctional siloxane, based on the unmodified metal oxide. In a further preferred embodiment, 25 to 40% by weight of the monofunctional siloxane, based on the unmodified metal oxide, is used with the addition of an auxiliary.

The surface-modified metal oxide is preferably prepared by means of a method in which the preparation process takes place in separate steps. These include (1) intensive mixing of the metal oxide with the modifying agents (coating), (2) reaction of the metal oxide with the coating agent and (3) purification of the silica.

In the context of the invention, the terms "modifying agent" and "coating agent" are synonyms. Similarly, the terms "modification" or "reaction" are synonyms, with the corresponding process step being referred to as (2).

Preferably, the reaction is followed by a purification of the modified silica, where, most preferably, excess modifying agent and byproducts are removed.

The surface modification (reaction) is preferably carried out in an atmosphere which does not lead to the oxidation of the surface-modified metal oxide, i.e. preferably comprises less than 10% by volume of oxygen and more preferably less than 2.5% by volume of oxygen; best results are attained at less than 1% by volume of oxygen.

The pressure during the process steps preferably ranges from a slight subatmospheric pressure of 0.2 bar up to a superatmospheric pressure of 100 bar, with particular preference being given, for technical reasons, to standard pressure, i.e. unpressurized operation relative to the external/atmospheric pressure.

Optionally, protic solvents can be added to the process. A solvent is referred to as protic if one molecule has a functional group from which hydrogen atoms in the molecule can be cleaved off as protons (dissociation). In view of the high polarity of the OH bond, it can be cleaved comparatively easily with elimination of a positively charged hydrogen atom, the proton.

The most important protic solvent is water, which dissociates (with simplified terms) into a proton and a hydroxide ion. Further protic solvents are e.g. alcohols and carboxylic acids. According to the invention, liquid or vaporizable alcohols such as isopropanol, ethanol or methanol or water, for example, can be added as protic solvent. It is also possible to add mixtures of the aforementioned protic solvent. Preference is given to adding 1 to 50% by weight of protic solvents, based on the metal oxide, more preferably 5 to 25% by weight. Particular preference is given to the addition of water as protic solvent.

The modification reaction according to the invention preferably takes place as a gas phase process, i.e. the coating agent is added to the pure, very largely dry (therefore pulverulent) silica. In a liquid phase process, by contrast, the silica is initially introduced in a liquid phase.

Preferably, the modification reaction according to the invention does not take place in an aqueous phase.

The siloxanes are added to the process as modifying agents (coating agents) preferably in liquid form, and more preferably are mixed in with the pulverulent metal oxide. The compounds here can be admixed in pure form or as solutions in known solvents used industrially, for example alcohols such as e.g. methanol, ethanol or isopropanol, ethers such as e.g. diethyl ether, THF or dioxane, or aliphatic or aromatic hydrocarbons such as e.g. hexanes or toluene. The concentration in the solution here is 5 to 95% by weight, preferably 30 to 95% by weight, and more preferably 50 to 90% by weight.

In addition to the aforementioned monofunctional siloxanes, it is possible to add further alternative modifying agents. Of use in this connection are all known compounds, or possibly also mixtures thereof, used for surface modification. Preference is given to using reactive silicon compounds such as, for example, silylamines, chloro-, hydroxy- or alkoxysilanes and -siloxanes or mixtures thereof. In a particularly preferred embodiment, hexamethyldisilazane is used. The modification of the metal oxide with these can take place before, at the same time as or after the modification with the monofunctional siloxanes. In a preferred embodiment, firstly the modification with the monofunctional siloxanes takes place. The reaction with the further modifying agents is then carried out.

The examples KS4 and KS6 compared to KS3 and KS5 reveal that the corresponding aftertreatment again brings about a considerable improvement in the thickening effect of the silicas.

Moreover, for producing the metal oxides according to the invention it is possible to use substances which shorten the required reaction times and/or make it possible to reduce the process temperatures. These catalytically or stoichiometrically effective substances are referred to hereinabelow by the term auxiliaries. They include preferably acidically or basically reacting substances. They can be selected, for example, from the group of Lewis acids, which include e.g. trivalent aluminum and boron compounds. Preference is also given to using Bronsted acids, such as e.g. hydrogen halides or organic acids. Particular preference is given here to hydrogen chloride or acetic acid. In a further embodiment, basically reacting compounds are used as auxiliaries, for example hydroxides of alkali metals and alkaline earth metals, and also their salts derived from the corresponding alcohols or carboxylic acids. Furthermore, they can be selected from nitrogen-containing compounds such as ammonia or organically substituted primary, secondary or tertiary amines. The monovalent organic substituents of the specified alcohols, carboxylic acids and amines include saturated and unsaturated, branched and unbranched hydrocarbon radicals, which can moreover also further contain heteroatoms or functional groups. The auxiliaries can be added without dilution or else as a solution in inert or reactive solvents. Preference is given to using aqueous sodium or potassium hydroxide solution, aqueous ammoniacal solution, isopropylamine, n-butylamine, isobutylamine, t-butylamine, cyclochexylamine, triethylamine, morpholine, piperidine or pyridine.

In a preferred embodiment, the amounts of auxiliary used are 0.1 to 10% by weight, based on the unmodified metal oxide. Preference is given to using 0.2 to 5% by weight. Particular preference is given here to the use of 0.5 to 1.5% by weight of auxiliary, based on the unmodified metal oxide.

The coating of the pulverulent metal oxide with the specified modifying agents is preferably accomplished by nozzle technology or comparable technology. Effective jetting technology can be, for example, jetting in 1-fluid nozzles under pressure (preferably 5 to 20 bar), spraying in 2-fluid nozzles under pressure (preferably gas and liquid 2 to 20 bar), ultrafine division with atomizers for gas/solid exchange units having movable, rotating or static internals, which allow homogeneous distribution of the coating agents with the pulverulent metal oxide.

The aerosol can be applied via nozzles from above onto the pulverulent solid which has been set in motion, or introduced into the fluidized solid, preference being given to jetting from above.

The coating agents are preferably added as very finely divided aerosol, characterized in that the aerosol has a sink speed of 0.1 to 20 cm/s. An aerosol is a mixture (dispersion) of solid or liquid suspended particles and a gas.

The addition of the modifying agents and the protically reacting compounds and/or auxiliaries can take place simultaneously or in succession. Preference is given first to homogeneous coating of the metal oxide with the protically reacting compounds and/or auxiliaries and then or at a later time to coating with the coating agents.

The reaction (step 2) preferably takes place at temperatures which permits as quantitative a reaction. as possible of the functional group with the surface of the metal oxide without decomposing the siloxane in the process. Preference is given here to using temperatures from 30° C. to 350° C. and more preferably from 40° C. to 250° C. In a particularly preferred embodiment, the reaction step takes place at 150° C. to 230° C. and in the absence of an auxiliary. In a further preferred embodiment, the reaction step takes place at 80° C. to 120° C. with the assistance of an auxiliary.

The temperature profile can be kept constant during the reaction or, as described in EP 1 845 136, can have an ascending gradient.

The residence time of the reaction (step 2) is preferably 1 min to 24 h, more preferably 15 min to 300 min and, for reasons of the space-time yield, most preferably 15 min to 240 min.

Coating (1) and reaction (2) preferably take place with mechanical or gas-borne fluidization. Whereas in the case of mechanical fluidization the particulate powder is brought into the fluid state by movement of a body (for example a stirring paddle) in the fluidized bed process, this is achieved by gas-borne fluidization simply by introduction of a gas (e.g. into the fluidized bed). Gas-borne fluidization can be accomplished by all inert gases which do not react with the modifying agent, the metal oxide and the modified metal oxide, in other words do not lead to secondary reactions, degradation reactions, oxidation processes and flame and explosion phenomena. Nitrogen, argon and other noble gases as well as carbon dioxide are preferably used here. The introduction of the gases to the fluidization preferably takes place with superficial gas velocities ranging from 0.05 to 5 cm/s and more preferably from 0.5 to 2.5 cm/s. The term "superficial gas velocity" refers to the flow rate of the flowing gas present in the range in which the steps (1) coating (2) reaction and (3) purification are carried out, and to the free cross-sectional area of the corresponding area through which the flow passes. Particular preference is given to mechanical fluidization, which takes place without additional use of gas beyond the inertization, by means of paddle stirrers, anchor stirrers, and other suitable stirring members.

The purification step (3) is preferably characterized by movement, with slow movement and a low level of mixing being particularly preferred. The stirring members in this case are advantageously adjusted and moved in such a way that there is mixing and fluidizing, but not complete vortexing.

During the purifying step (3) for removing unreacted starting materials and also byproducts that have been produced, the process temperature can optionally be raised. The purification preferably takes place at a purification temperature of 100° C. to 350° C., more preferably at 105° C. to 180° C. and most preferably from 110° C. to 140° C. In a further preferred embodiment, the separation takes place particularly preferably at temperatures from 180° C. to 240° C.

In order to avoid oxidation and to make the purification more effective, this process step (3) can also include the supply of relatively large amounts of an inert gas, preferably nitrogen, argon and other noble gases, and also carbon dioxide, preferably corresponding to a superficial gas velocity of 0.001 to 10 cm/s, more preferably 0.01 to 1 cm/s.

Coating, reaction and purification can be carried out as discontinuous process (batch process) or continuous process. For technical reasons, preference is given to a continuous reaction procedure, as described for example in EP 1 845 136.

Additionally during the coating in step (1) and/or modification in step (2) and/or after the purification, it is possible to use continuous or discontinuous methods for the mechanical compaction or structural modification of the metal oxide, such as, for example, pressing rolls, grinding units, such as edge runner mills or bore mills, compaction by screws or screw mixers, screw compressors, briquetting machines, or compaction by withdrawal of the air or gas content under suction by means of suitable vacuum methods. Particular preference is given to the mechanical compaction or structural modification during step (1) by pressing rolls, grinding units such as ball mills or compaction by screws, screw mixers, screw compressors and briquetting machines.

In a further particularly preferred procedure, following the purification, methods are used for the mechanical compaction of the metal oxide, such as compacting by withdrawal of the air or gas content under suction by means of suitable vacuum methods, or pressing rolls, or a combination of both methods.

Additionally, in a particularly preferred procedure, following the purification, methods can be used for deagglomerating the metal oxide, such as pinned disk mills, hammer mills, opposed-jet mills, impact mills, or devices for milling/classifying.

A further subject of the invention is the metal oxides preparable by the method described above.

A further subject of the invention is the use of the surface-modified nanostructured metal oxides according to the invention or of the surface-modified nanostructured metal oxides produced by the process according to the invention for controlling the flow properties of media such as adhesives, sealants and coating materials, for improving the mechanical properties of elastomers, and for controlling the charge and flow properties of powder such as toners or powder coating materials. The metal oxides according to the invention are preferably used in adhesives, sealants or silicone elastomers.

A preferred embodiment is the use of the silicas according to the invention as thickeners in polar systems, more preferably in epoxide resins.

Furthermore, preference is given to the use of the silicas according to the invention for improving the pourability of pulverulent material, in particular for use in toners.

Moreover, the silicas according to the invention are preferably used as reinforcing filler, in particular in silicone rubber.

Analytical Method:

1. Determination of the carbon content (% C)

Elemental analysis for carbon was carried out in accordance with DIN ISO 10694 using a CS-530 elemental analyzer from Eltra GmbH (D-41469 Neuss).

2. Determination of the residual content of unmodified silica silanol groups

The residual silanol content was determined analogously to G. W. Sears et al. *Analytical Chemistry* 1956, 28, 1981ff by means of acid-based titration of the silica suspended in a 1:1 mixture of water and methanol. The titration was carried out in the region above the isoelectric point and below the pH range of dissolution of the silica. The residual silanol content in % can accordingly be calculated according to the following formula:

$$SiOH = SiOH(silyl)/SiOH(phil)*100\%$$

where

SiOH(phil): Titration volume from the titration of the untreated silica

SiOH(silyl): Titration volume from the titration of the silylated silica

3. Determination of the extractable fraction, i.e. the fraction of extractable silylating agent 2.5 g of the silica under investigation are stirred into 47.5 g of tetrahydrofuran using a spatula in a screw-top PE vessel, and the vessel is then closed. After a resting time of 30 minutes in an ice bath, the mixture is treated for 30 min in an ultrasound bath with ice cooling (Sonorex Digitec DT 156, BANDELIN electronic GmbH & Co. K G, D-12207 Berlin) and then the clear filtrate is obtained by pressure filtration (5 bar nitrogen) through a PTFE membrane filter (pore size: 0.2 µm, diameter: 47 mm, Sartorius A G, Göttingen). Of this, exactly 10.00 ml are taken off as an analysate for determining the silicon content by means of atomic absorption spectroscopy (Atom Absorption Spectrometer 2100, Perkin Elmer Waltham, Mass., USA) and weighed.

The extractable constituents in % by weight can be calculated to a first approximation as follows:

$$\text{Extractable constituents} = 10^{-4} \times \frac{m(THF) \times V(analysate)}{m(\text{metal oxide}) \times M(Si)} \times \frac{c(analysate) \times M(R^4R^5SiO_{2/2})}{m(analysate)}$$

where m(THF): Initial weight of tetrahydrofuran (=47.50 g)

V(analysate): Volume of the analysate (=10.00 ml)

m(metal oxide): Initial weight of the surface-modified metal oxide (=2.50 g)

M(Si): Molar mass of silicon (=28.09 g/mol)

c(analysate): Silicon content of the analysate in mg/l m(analysate): Final weight of the analysate in g $M(R^4R^5SiO_{2/2})$: Molecular mass of the D groups $R^4R^5SiO_{2/2}$ in g/mol 4. NMR spectroscopic characterization Selected samples were investigated by means of $^{29}$Si-SP/MAS solid-state NMR spectroscopy. MAS (Magic Angle Spinning) is a technique for improving the signal quality in solid-state nuclear magnetic resonance spectroscopy (NMR spectroscopy) which is based on the very rapid rotation of the sample during measurement. SP stands for single pulse. The NMR spectrometer used was AVANCE 400 WB from Bruker (Bruker Corporation, Billerica, Mass., USA) equipped with a 7 mm MAS probe (resonance frequency for $^{29}$Si 79.51 MHz). The measurements were carried out at room temperature. The $^{29}$Si-chemical shifts were referenced to tetramethylsilane (TMS)=0 ppm as external reference standard, using octakis (trimethylsiloxy)silsesquioxane ($Q_8M_8$, the most strongly shielded $Q^4$ group is at −109 ppm relative to TMS).

The relative ratios given in table 1 of the D and M signals (assignment of the signals to D and/or M groups can be found for example in G. Engelhardt et al. *Polymer Bulletin*, 1981, 5, 557ff) was calculated from the signal intensities obtained by deconvolution, in accordance with the following formula:

$$D/M(^{29}\text{Si-}SP/MAS) = \frac{Int(D)}{Int(M)}$$

where
Int(D): Intensity of the signal of the D groups
Int(M): Intensity of the signal of the T2 group
Moreover, the selected samples were investigated by means of $^{29}$Si-CP/MAS NMR spectroscopy, where CP stands for cross polarization. The NMR spectrometer used was AVANCE 400 WB from Bruker equipped with a 7 mm double resonance MAS probe (field strength 9.4 Tesla; resonance frequency for $^{29}$Si 79.51 MHz and 400.23 MHz for $^1$H). A linear ramp of 80-100% was used for the proton RF amplitude during the cross polarization (CP) with a HAS rotational frequency of 5 kHz. The contact time was 5 ms. Up to 20,000 scans were recorded with an experimental repetition time of 3 s (further recording parameters: 90° Si pulse=5 μs, TD=1662, SWH=23809, o1=−5566 Hz, decoupling: TPPM15; processing parameters: SI=16384; Gaussian multiplication with LB=−5 Hz and GB=0.03). All of the measurements were carried out at room temperature. The $^{29}$Si chemical shifts were referenced to tetramethylsilane (TMS)=0 ppm using octakis(trimethylsiloxyl)silsesquioxane ($Q_8M_8$, the most strongly shielded $Q^4$ group is at −109 ppm relative to TMS). In the resulting spectra, the resonances for the M groups were practically impossible to make out.

5. Determination of the pH

The determination was carried out as described in DIN EN 787-9, but using a 4% strength dispersion of the sample in a water/methanol mixture of volume ratio 1:1.

EXAMPLES

Example S1

Added to 120 g of a hydrophilic silica having a specific surface area of 200 m$^2$/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) was a mixture consisting of 1.2 g of water and 2.4 g of methanol. Added subsequently in an analogous manner were 20 g of Me$_3$Si(OSiMe$_2$)$_3$Cl (hollow cone nozzle, model 121, from Düsen-Schlick GmbH, D-96253 Untersiemau/Coburg, 30° spray angle, 0.2 mm bore, operated with 5 bar nitrogen). The reaction mixture was heated. firstly at 80° C. for one hour with vigorous stirring and then at 200° C. for a further two hours. After cooling the sample to room temperature, it was analyzed.

The experiment data and analytical data are summarized in table 1. The result of the $^{29}$Si-SP/MAS measurements given in each case is the quotient D/M of the integrals of the signal for the Me$_2$Si(O$_{1/2}$)$_2$ (D) and Me$_3$SiO$_{1/2}$(M).

Example S2

Added to 120 g of a hydrophilic silica having a specific surface area of 200 m$^2$/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) was 1.3 g of water. Added subsequently in an analogous manner were 24 g of siloxane I (hollow cone nozzle, model 121, from Düsen-Schlick GmbH, D-96253 Untersiemau/Coburg, 30° spray angle, 0.2 mm bore, operated with 5 bar nitrogen). The reaction mixture was heated firstly at 80° C. for one hour with vigorous stirring and then at 200° C. for a further two hours.

The analysis of the cooled sample was carried out analogously to example S1 and is listed in table 1.

Example S3

Added to 120 g of a hydrophilic silica having a specific surface area of 200 m$^2$/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) was a mixture consisting of 0.6 g of water and 1.2 g of methanol. Added subsequently in an analogous manner were 10 g of Me$_3$Si (OSiMe$_2$)$_3$Cl (hollow cone nozzle, model 121, from Düsen-Schlick GmbH, D-96253 Untersiemau/Coburg, 30° spray angle, 0.2 mm bore, operated with 5 bar nitrogen). The reaction mixture was heated firstly at 80° C. for one hour with vigorous stirring and then at 200° C. for a further two hours.

The analysis of the cooled sample was carried out analogously to example S1 and is listed in table 1.

Example S4

Added to 120 g of a hydrophilic silica having a specific surface area of 200 m$^2$/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) was a mixture consisting of 0.2 g of water and 0.5 g of methanol. Added subsequently in an analogous manner were 4 g of Me$_3$Si (OSiMe$_2$)$_3$Cl (hollow cone nozzle, model 121, from Düsen-Schlick GmbH, D-96253 Untersiemau/Coburg, 30° spray angle, 0.2 mm bore, operated with 5 bar ndtrogen). The reaction mixture was heated firstly at 80° C. for one hour with vigorous stirring and then at 200° C. for a further two hours.

After cooling the product to 50° C., 12 g of hexamethyldisilazane followed by 2.7 g of water were sprayed on (hollow cone nozzle, model 121, from Düsen-Schlick GmbH, D-96253 Untersiemau/Coburg, 30° spray angle, 0.1 mm bore, operated with 5 bar nitrogen.) and heated again at 120° C. for one hour.

The analysis of the cooled sample was carried out analogously to example S1 and is listed in table 1.

Example S5

Added to 120 g of a hydrophilic silica having a specific surface area of. 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 22 g of a monofunctional permethylsiloxanol produced according to EP 1 883 666 which can be represented by the formula $Me_3Si(OSiMe_2)_{23}OH$. The reaction mixture was heated at 200° C. for one hour with vigorous stirring.

The analysis of the cooled sample was carried out analogously to example S1 and is listed in table 1.

Example S6

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 22 g of a monofunctional permethylsiloxanol produced according to EP 1 883 666 which can be represented by the formula $Me_3Si(OSiMe_2)_{23}OH$. The reaction mixture was heated at 200° C. for one hour with vigorous stirring.

After cooling the product to 50° C., 12 g of hexamethyldisilazane followed by 2.7 g of water were sprayed on (hollow cone nozzle, model 121, from Düsen-Schlick GmbH, D-96253 Untersiemau/Coburg, 30° spray angle, 0.1 mm bore, operated with 5 bar nitrogen) and heated again at 120° C. for one hour.

The analysis of the cooled sample was carried out analogously to example S1 and is listed in table 1.

Example S7

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 13 g of a monofunctional permethylsiloxanol produced according to EP 1 883 666 which can be represented by the formula $Me_3Si(OSiMe_2)_{14}OH$. The reaction mixture was heated at 200° C. for one hour with vigorous stirring.

The analysis of the cooled sample was carried out analogously to example S1 and is listed in table 1.

Example S8

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 25 g of a monofunctional permethylsiloxanol produced according to EP 1 883 666 which can be represented by the formula $Me_3Si(OSiMe_2)_{14}H$. The reaction mixture was heated at 200° C. for one hour with vigorous stirring.

The analysis of the cooled sample was carried out analogously to example S1 and is listed in table 1.

Example S9

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 38 g of a monofunctional permethylsiloxanol produced according to EP 1 883 666 which can be represented by the formula $Me_3Si(OSiMe_2)_{14}OH$. The reaction mixture was heated at 200° C. for one hour with vigorous stirring.

The analysis of the cooled sample was carried out analogously to example S1 and is listed in table 1.

Example S10

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, 0-96253 Untersiemau/Coburg, 30° spray angle, 0.1 mm bore, operated with 5 bar nitrogen) were 4 g of a 25% strength aqueous solution of ammonia. Added subsequently in an analogous manner (hollow cone nozzle, model 121 from Düsen-Schlick GmbH, D-96253 Untersiemau/Coburg, 30° spray angle, 0.2 mm bore, operated with 5 bar nitrogen) were 38 g of a monofunctional permethylsiloxanol prepared according to according EP 1 883 666 which can be represented by the formula $Me_3Si(OSiMe_2)_{14}OH$. The reaction mixture was heated at 100° C. for two hours with vigorous stirring.

The analysis of the cooled sample was carried out analogously to example S1 and is listed in table 1.

Example S11

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) were 1.6 g of triethylamine. Added subsequently in an analogous manner (hollow cone nozzle, model 121 from Düsen-Schlick GmbH, D-96253 Untersiemau/Coburg, 30° spray angle, 0.2 mm bore, operated with 5 bar nitrogen) were 38 g of a monofunctional permethylsiloxanol prepared according to EP 1 883 666 which can be represented by the formula $Me_3Si(OSiMe_2)_{14}OH$. The reaction mixture was heated at 100° C. for two hours with vigorous stirring.

The analysis of the cooled sample was carried out analogously to example S1 and is listed in table 1.

Example S12

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) were 1.2 g of butylamine. Added subsequently in an analogous manner (hollow cone nozzle, model 121 from Düsen-Schlick GmbH, D-96253 Untersiemau/Coburg, 30° spray angle, 0.2 mm bore, operated with 5 bar nitrogen) were 38 g of a monofunctional permethylsiloxanol prepared according to EP 1 883 666 which can be represented by the formula $Me_3Si(OSiMe_2)_{14}OH$. The reaction mixture was heated at 100° C. for two hours with vigorous stirring.

The analysis of the cooled sample was carried out analogously to example S1 and is listed in table 1.

Example S13

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) were 25 g of a monofunctional dimethylsiloxanol prepared according to EP 1 883 666 which can be represented by the formula $Me_3Si(OSiMe_2)_{14}OH$. The reaction mixture was heated at 200° C. for one hour with vigorous stirring.

The analysis of the cooled sample was carried out analogously to example S1 and is listed in table 1.

Example S14

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.2 mm bore, operated with 5 bar nitrogen) were 25 g of a monofunctional dimethylsiloxanol prepared according to EP 1 883 666 which can be represented by the formula $Me_3Si(OSiMe_2)_{14}OH$. The reaction mixture was heated at 200° C. for one hour with vigorous stirring.

The analysis of the cooled sample was carried out analogously to example S1 and is listed in table 1.

Example S15

Added to 120 g of a hydrophilic silica having a specific surface area of 200 m²/g, determined by the BET method in accordance with DIN 66131 and 66132 (available under the name HDK® N20 from Wacker Chemie AG, Munich, Germany) under a nitrogen atmosphere, by jetting through a two-fluid nozzle (hollow cone nozzle, model 121, from Düsen-Schlick GmbH, D-96253 Untersiemau/Coburg, 30° spray angle, 0.1 mm bore, operated with 5 bar nitrogen) are 1.2 g of butylamine. Added subsequently in an analogous manner (hollow cone nozzle, model 121 from Düsen-Schlick GmbH, D-96253 Untersiemau/Coburg, 30° spray angle, 0.2 mm bore, operated. with 5 bar nitrogen.) are 38 g of a monofunctional permethylsiloxanol prepared according to EP 1 883 666 which can be represented by the formula $Me_3Si(OSiMe_2)_{14}OH$. The reaction mixture is heated at 100° C. for two hours with vigorous stirring.

The analysis of the cooled sample was carried out analogously to example S1 and is listed in table 1. All results are listed in tab. 1.

TABLE 1

Experimental and analytical data of examples S1 to S15
Siloxane I: $Me_3Si(OSiMe_2)_3Cl$; siloxane II: $Me_3Si(OSiMe_2)_{23}OH$; Siloxane III: $Me_3Si(OSiMe_2)_{14}OH$;
*) Commercial products of Wacker Chemie AG
**) Not applicable
— Not used

| | Coating agent | Auxiliary | Post-treatment | Residual silanol content [%] | Carbon contents [%] | Extractable constituent [%] | pH | D/M ($^{29}$Si-SP/MAS) |
|---|---|---|---|---|---|---|---|---|
| S1 | Siloxane I | — | — | 38 | 3.3 | 2.3 | 4.2 | 3.2 |
| S2 | Siloxane I | — | — | 66 | 3.7 | 5.5 | 4.6 | — |
| S3 | Siloxane I | — | — | 53 | 2.2 | 1.0 | 4.3 | — |
| S4 | Siloxane I | — | $HN(SiMe_3)_2$ | 19 | 2.5 | 0.3 | 7.5 | — |
| S5 | Siloxane II | — | — | 82 | 3.4 | 2.1 | 4.6 | 23.9 |
| S6 | Siloxane II | — | $HN(SiMe_3)_2$ | 13 | 7.1 | 6.4 | 6.8 | — |
| S7 | Siloxane III | — | — | 82 | 2.9 | 1.9 | 4.6 | — |
| S8 | Siloxane III | — | — | 67 | 5.6 | 4.1 | 4.8 | — |
| S9 | Siloxane III | — | — | 47 | 7.6 | 3.0 | 6.5 | 12.6 |
| S10 | Siloxane III | $NH_3$ (aq) | — | 26 | 7.7 | 3.1 | 9.2 | 11.9 |
| S11 | Siloxane III | $Net_3$ | — | 32 | 8.3 | 3.4 | 10.0 | — |
| S12 | Siloxane III | $BuNH_2$ | — | 22 | 8.1 | 3.1 | 10.1 | 14.8 |
| S13 | Siloxane III | — | — | 61 | 5.3 | 3.6 | 5.0 | — |
| S14 | Siloxane III | — | — | 60 | 5.5 | 3.8 | 7.1 | — |
| S15 | Siloxane III | $BuNH_2$ | — | 20 | 8.2 | 2.8 | 10.3 | — |
| HDK ® H18 | *) | *) | *) | 19 | 4.6 | 0.9 | 5.3 | — |

TABLE 1-continued

Experimental and analytical data of examples S1 to S15
Siloxane I: $Me_3Si(OSiMe_2)_3Cl$: siloxane II: $Me_3Si(OSiMe_2)_{23}OH$; Siloxane III:
$Me_3Si(OSiMe_2)_{14}OH$;
*) Commercial products of Wacker Chemie AG
**) Not applicable
— Not used

| | Coating agent | Auxiliary | Post-treatment | Residual silanol content [%] | Carbon contents [%] | Extractable constituent [%] | pH | D/M ($^{29}$Si-SP/MAS) |
|---|---|---|---|---|---|---|---|---|
| HDK ® H20 | *) | *) | *) | 43 | 1.1 | 0.1 | 4.1 | — |
| HDK ® N20 | *) | *) | *) | 100 | **) | **) | 4.1 | — |

Application Examples

Example 16

3 g each of the experimental products S1-S12, and also of commercial products HDK® H18, H20 and N20 were incorporated under ambient pressure in a DISPERMAT® vacuum dissolver from VMA Getzmann GmbH (D-51580 Reichshof) equipped with a 40 mm dissolver disk within 1 to 2 minutes at 750 rpm into 97 g of Epikote R1M135, acquired from Hexion Specialty Chemicals Inc. (D-47138 Duisberg), and then are dispersed at 600 rpm for 5 minutes under reduced pressure (0.3 bar). After a resting time of one hour, the viscosity of the dispersion was measured in rotation at room temperature by means of an air-cushioned Haake RheoStress 600 rheometer with cone/plate geometry (35 mm, 2°) at 25° C. To determine the viscosity, a measurement profile was used here consisting of two sections, with shearing taking place first for 120 s at 1 s$^{-1}$ and then for a further 120 s at 10 s$^{-1}$. The viscosity given in table 2 was determined as an average value from the last 10 data points of the second section. All of the results are listed in tab. 2.

TABLE 2

Experimental and analytical data of example 16
Siloxane I: $Me_3Si(OSiMe_2)_3Cl$
Siloxane II: $Me_3Si(OSiMe_2)_{23}OH$
Siloxane III: $Me_3Si(OSiMe_2)_{14}OH$;
*) Commercial products of Wacker Chemie AG
— Not used Starting material

| Name | Coating agent | Auxiliary | Post-treatment | Viscosity (Pa · s) |
|---|---|---|---|---|
| S1 | Siloxane I | — | — | 5.8 |
| S2 | Siloxane I | — | — | 2.7 |
| S3 | Siloxane I | — | — | 3.5 |
| S4 | Siloxane I | — | HN(SiMe$_3$)$_2$ | 4.6 |
| S5 | Siloxane II | — | — | 5.4 |
| S6 | Siloxane II | — | HN(SiMe$_3$)2 | 7.9 |
| S7 | Siloxane III | — | — | 5.6 |
| S8 | Siloxane III | — | — | 11.3 |
| S9 | Siloxane III | — | — | 11.4 |
| S10 | Siloxane III | NH$_3$(aq) | — | 7.7 |
| S11 | Siloxane III | NEt$_3$ | — | 8.3 |
| S12 | Siloxane III | BuNH$_2$ | — | 10.9 |
| HDK ® H18 | *) | *) | *) | 7.6 |
| HDK ® H20 | *) | *) | *) | 2.7 |

Example 17

40 g each of the products from examples S7 to S13, and also the commercial products HDK® H18, H20 and N20 were incorporated under ambient pressure in a planetary dissolver model Labotop 1 from PC Laborsystem GmbH (CH-4312 Magden) equipped with a 65 mm dissolver disc, kneading hook CONI 1 (bar length=20 mm) and a scrapper model CONI 1 with PT100 and PTFE blade at 250 rpm into 460 g of Epikote 828, acquired from Overlack AG (D-41061 Mönchengladbach) via Combi GmbH (D-41061 Mönchengladbach). The time until complete wetting of the respective silica is given in table 3 as incorporation time. After incorporation has taken place, dispersion was carried out for 5 min or 30 min under reduced. pressure (approx. 50 mbar) and with water cooling (dissolver disc: 500 rpm, kneading hook: 600 rpm).

After a resting time of one or seven days, the viscosity of the dispersion was measured in rotation (300 s at 0.1 s$^{-1}$) by means of an air-cushioned Haake RheoStress 600 rheometer with cone/plate geometry (35 mm 2°) at 25° C. The viscosity ascertained after a measuring time of 300 s is given in table 3). All of the results are listed in tab. 3.

TABLE 3

Experimental and analytical data of example 17
Siloxane III: $Me_3Si(OSiMe_2)_{14}OH$;
*) Commercial products of Wacker Chemie AG
— Not used

| Name | Coating agent | Auxiliary | Incorporation time [s] | Viscosity after 1 d (Pa · s) | Viscosity after 7 d (Pa · s) |
|---|---|---|---|---|---|
| S7 | Siloxane III | — | 110 | 2660 | 2820 |
| S8 | Siloxane III | — | 100 | 6960 | 6830 |
| S9 | Siloxane III | — | 85 | 8560 | 8430 |
| S10 | Siloxane III | NH$_3$(aq) | 90 | 5620 | 5590 |
| S11 | Siloxane III | Net$_3$ | 95 | 6020 | 5520 |
| S12 | Siloxane III | BuNH$_2$ | 120 | 5700 | 5570 |
| S13 | Siloxane III | — | 100 | 6830 | 6650 |
| HDK ® H18 | *) | *) | 600 | 5490 | 5750 |
| HDK ® H20 | *) | *) | 240 | 215 | 202 |
| HDK ® N20 | *) | *) | 110 | 55 | 51 |

Example 18

Under ambient pressure, a DISPERMAT® CA40C dissolver from VMA-Getzmann GmbH (D-51580 Reichshof) equipped with a 40 mm dissolver disk at 1000 rpm was charged with 288 g of Epikure RIMH 137, acquired from Momentive Specialty Chemicals Stuttgart GmbH (D-73730 Esslingen), and 12 g of the products from examples S7 to S13, and also of the commercial products HDK® H18, H20 and N20 were continuously metered in. When incorporation was complete, dispersion was carried out for 30 min under reduced pressure (approx. 50 mbar) and with water cooling (4774 rpm).

After a resting time of one or seven days, the viscosity of the dispersion was measured in rotation (0.1 s$^{-1}$) by means of an air-cushioned Haake RheoStress 600 rheometer with cone/plate geometry (35 mm 2°) at 25° C. The viscosity ascertained. after a measuring time of 300 s is given in table 4. All of the results are listed in tab. 4.

TABLE 4

Experimental and analytical data of example 18
Siloxane III: Me$_3$Si(OSiMe$_2$)$_{14}$OH;
*) Commercial products of Wacker Chemie AG
— Not used

| Starting material | | | Viscosity after 1 d | Viscosity after 7 d |
|---|---|---|---|---|
| Name | Coating agent | Auxiliary | (Pa · s) | (Pa · s) |
| S7 | Siloxane III | — | 0.31 | 0.13 |
| S8 | Siloxane III | — | 9.77 | 0.72 |
| S9 | Siloxane III | — | 44.8 | 1.33 |
| S10 | Siloxane III | NH$_3$(aq) | 17.4 | 6.31 |
| S11 | Siloxane III | NEt$_3$ | 38.9 | 33.6 |
| S12 | Siloxane III | BuNH$_2$ | 23.7 | 10.2 |
| S13 | Siloxane III | — | 2.45 | 0.53 |
| HDK ® H18 | *) | *) | 1.33 | 1.05 |
| HDK ® N20 | *) | *) | 0.26 | 0.27 |

Example 19

In order to ascertain the reinforcing effect of the filler, after a resting time of 7d, selected dispersions of examples 17 and 18 were used to produce test pieces. For this, the respective dispersions of a silica type were homogeneously mixed into Epikote 828 or Epikure RIME 137 in the ratio 40:11 and poured into a silicone mold which was modeled on test. piece type 1B according to DIN EN ISO 527-2. The thickness h of the test piece was deviating from the specified standard DIN EN ISO 527-2 by 7 mm. After curing the test pieces at room temperature in the air, the tensile properties listed in table 4 are determined in accordance with DIN EN ISO 527. All of the results are listed in tab. 5.

TABLE 5

Experimental and analytical data of example 19
Siloxane III: Me$_3$Si(OSiMe$_2$)$_{14}$OH;
*) Commercial products of Wacker Chemie AG
— Not used

| Starting material | | | Breaking stress | Tensile elongation |
|---|---|---|---|---|
| Name | Coating agent | Auxiliary | σ$_b$ [MPa] | ε [%] |
| S12 | Siloxane III | BuNH$_2$ | 2.4 | 0.06 |
| S13 | Siloxane III | — | 2.5 | 0.07 |
| HDK ® H18 | *) | *) | 1.6 | 0.03 |

Example 20

To produce a sealant formulation, 25 g of Geniosil® STP-E10 (available at Wacker Chemie AG, Munich, Germany) were homogenized in a laboratory planetary mixer from PC-Laborsystem, equipped with two bar mixers, at approx. 25° C. with 24.7 g of polypropylene oxide (commercially available under the name Acclaim 2200 from Bayer Material Science AG, Leverkusen) and 1.5 g of vinyltrimethoxysilane (available as Geniosil® XL 10 from Wacker Chemie AG, Munich, Germany) for two minutes at 600 rpm.

Then, 43.3 g of a marble flour coated with steric acid and having an average particle diameter (D50%) of approx. 2.0 mm (commercially available under the name Omyabond 520 from Omya GmbH, Cologne, Germany) and 4 g of the corresponding silica (S15, S16 or HDK® 518, commercially available from Wacker Chemie AG, Munich, Germany) were added and broken down for two minutes with stirring at 600 rpm. Finally, 1 g of 3-amino-propyltrimethoxysilane (available as Geniosil® GF 96 from Wacker Chemie AG, Munich, Germany) and 0.5 g of Tinuvin B75 (BASF Schweiz AG, 4057 Basel) were mixed in at 200 rpm for one minute and homogenized for a further minute at 200 rpm in part vacuum (approx. 100 mbar) and stirred bubble-free. The mass obtained in this way was transferred to 310 ml PB cartridges and stored for 24 h at 20° C. prior to the mechanical testing and rheological investigation in accordance with DIN 54458. To investigate the long-term storage stability, the cartridges were stored for 28d at 70° C. and 24 h at 20° C. All of the results are listed in tab. 6.1 and 6.2.

TABLE 6.1

Experimental and analytical data of example 20
Siloxane III: Me$_3$Si(OSiMe$_2$)$_{14}$OH;
*) Commercial products of Wacker Chemie AG
— Not used

| | Starting Material | | |
|---|---|---|---|
| | S14 | S15 | HDK ® H18 |
| Coating agent | Siloxane III | Siloxane III | *) |
| Auxiliary | — | BuNH$_2$ | *) |
| Tear elongation (%) | 446 | 432 | 455 |
| Tear resistance in accordance with DIN 53504-85 [N/mm$^2$] | 1.6 | 1.6 | 1.9 |
| Shore hardness in accordance with DIN 53505-A-87 [Shore A] | 33 | 33 | 35 |

TABLE 6.2

Experimental and analytical data of example 20
Siloxane III: Me$_3$Si(OSiMe$_2$)$_{14}$OH;
*) Commercial products of Wacker Chemie AG
— Not used

| | Starting material | | | | | |
|---|---|---|---|---|---|---|
| | S14 | | S15 | | HDK ® H18 | |
| | Storage time at 70° C. [d] | | | | | |
| | 0 | 28 | 0 | 28 | 0 | 28 |
| Skin formation time [min] | 80 | 160 | 50 | 135 | 57 | 140 |
| Storage modulus at 0.1% deformation [kPa] | 31.5 | 19.6 | 34.7 | 27.1 | 37.2 | 44.2 |
| Complex viscosity at 0.1% deformation [Pa * s] | 563 | 373 | 595 | 486 | 662 | 768 |

TABLE 6.2-continued

Experimental and analytical data of example 20
Siloxane III: Me$_3$Si(OSiMe$_2$)$_{14}$OH;
*) Commercial products of Wacker Chemie AG
— Not used

| | Starting material | | | | | |
|---|---|---|---|---|---|---|
| | S14 | | S15 | | HDK ® H18 | |
| | Storage time at 70° C. [d] | | | | | |
| | 0 | 28 | 0 | 28 | 0 | 28 |
| Shear stress [Pa] | 236 | 154 | 319 | 221 | 293 | 623 |
| Complex viscosity at 100% deformation [Pa * s] | 49.7 | 50.4 | 42.3 | 44.3 | 62.1 | 66.9 |

The invention claimed is:

1. A modified metal oxide bearing surface groups comprising groups of the formulae $R^1R^2R^3SiO_{1/2}$ (M) and $R^4R^5Si(O_{1/2})_2$ (D),
   where $R^1$, $R^2$, $R^3$, $R^4$ and $R^5$ are each, independently of one another, monovalent hydrocarbon radicals having 1 to 24 carbon atoms, where
   a) a residual silanol content of the metal oxide is 30-90% or
   b) a residual silanol content is 10-40%, and the carbon content is such that % C≥A+B·% SiOH, where A=9 and B=−0.015 and the values % C, A and % SiOH are given in weight percent.

2. The modified metal oxide of claim 1, wherein the metal oxide is silica.

3. The modified metal oxide of claim 1, wherein an extractable fraction is at most 6% by weight.

4. The modified metal oxide of claim 2, wherein an extractable fraction is at most 6% by weight.

5. The modified metal oxide of claim 1, wherein the relative intensities of the signals ascertained by integration of the signals from solid-state nuclear magnetic resonance spectroscopy ($^{29}$Si-SP/MAS-NMR) for D groups relative to M groups are in the range of from 1 to 50.

6. The modified metal oxide of claim 1, wherein a spectra obtained in by double resonance $^{29}$Si-CP/MAS-NMR exhibit a relative D/M ratio of >3.

7. A method for preparing a modified metal oxide of claim 1, comprising modifying a metal oxide by reacting the metal oxide with at least one monofunctional siloxane of the formula $R^1R^2R^3Si(OSiR^4R^5)_mX$,
   where X is a reactive group, and $R^1$, $R^2$, $R^3$, $R^4$ and $R^5$ are each independently a monovalent hydrocarbon radical having 1 to 24 carbon atoms and m=0 to 50, wherein reacting takes place at temperatures of 30° C. to 350° C.

8. A method for preparing a modified metal oxide of claim 1, comprising modifying a metal oxide by reacting the metal oxide with at least one monofunctional siloxane of the formula $R^1R^2R^3Si(OSiR^4R^5)_mX$,
   where X is a reactive group, and $R^1$, $R^2$, $R^3$, $R^4$ and $R^5$ are each independently a monovalent hydrocarbon radical having 1 to 24 carbon atoms and m=0 to 50, wherein
   a) reacting takes place in the absence of an auxiliary at a temperature of from 150 to 230° C., or
   b) reacting takes place in the presence of auxiliary which reduces the reaction time and/or the process temperatures, at a temperature of 80 to 120° C.

9. The method of claim 7, wherein reacting takes place in a gas phase.

10. The method of claim 8, wherein reacting takes place in a gas phase.

11. The method of claim 7, wherein reacting takes place at temperatures of 40° C. to 250° C.

12. A method of altering the flow properties of an adhesive, sealant, or coating material, comprising incorporating into the adhesive, sealant, or coating material, a modified metal oxide of claim 1.

13. A method of improving the mechanical properties of an elastomer, comprising incorporating into the elastomer, a modified metal oxide of claim 1.

14. A method for controlling the charge and/or flow properties of a powder, comprising incorporating into the powder a modified metal oxide of claim 1.

15. The method of claim 14, wherein the powder is a toner or a powder coating composition.

16. An adhesive, sealant, coating material, elastomer, or powder, comprising a modified metal oxide of claim 1.

* * * * *